Patented June 23, 1931

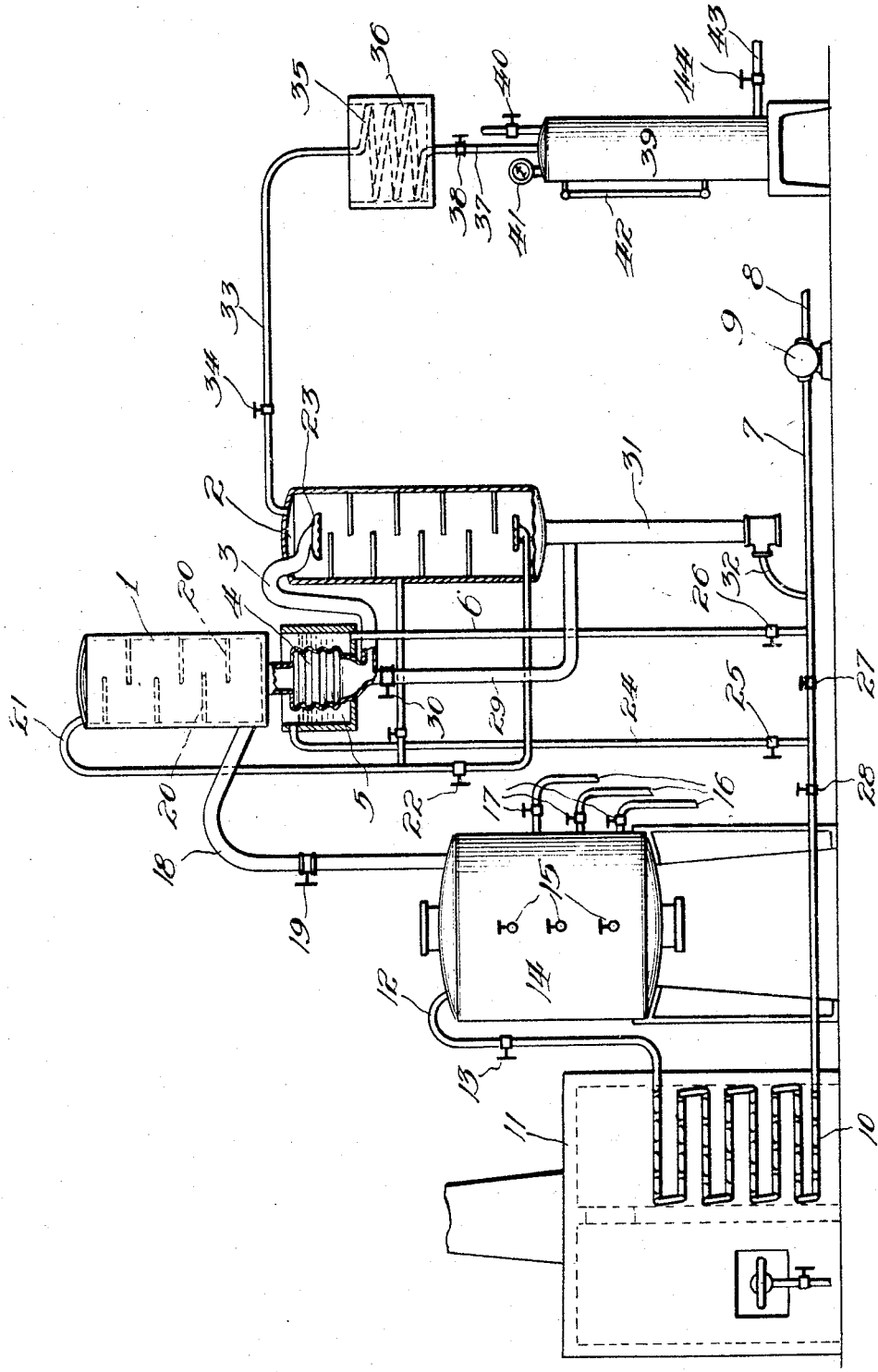

1,811,642

UNITED STATES PATENT OFFICE

JACQUE C. MORRELL AND HARRY P. BENNER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

PROCESS FOR CONVERTING HYDROCARBON OILS

Application filed April 21, 1923. Serial No. 633,638.

This invention relates to improvements in a process for converting hydrocarbon oils, and relates more particularly to a process in which the conversion is based upon the principle that any rectifying column or fractionating tower, (sometimes referred to as a dephlegmator) depends for its efficiency on a certain amount of liquid cooling medium coming in contact with the heated ascending vapors passing therethrough.

For the purposes of obtaining this contact, it is immaterial what type of contacting surfaces are used, as they may take the form of filling material in the towers, plates or pans, or any other surface whereby the liquids and vapors may be brought into intimate contact while the liquid substance is relatively finely divided to present as much surfacing to the vapors as possible. This reflux liquid may have two functions—one to remove the heat from the ascending vapors and extract therefrom the relatively high boiling point fractions, and second—permits the maintaining of a given relationship between the composition of the ascending vapors and the cooling medium used as a refluxing liquid.

The single figure is a diagrammatic side elevational view of the apparatus with parts in section.

In carrying out the invention, a primary condenser or tower 1 is connected with a secondary fractionating column 2 by means of the gooseneck arrangement 3, a portion of which functions at the same time as an inter-cooler. This inter-cooler 4 is positioned below the primary condenser or dephlegmator 1 so that the reflux liquid flows down into the cooler where it is surrounded by the relatively cool oil maintained in the tank 5 and supplied thereto through the line 6 from the charging line 7. The oil to be treated is introduced from any convenient source through the line 8, and is charged by means of the pump 9 either directly into the heating coil 10 positioned in the furnace 11 or passed in whole or in part through line 6 to chamber 5. The furnace is preferably of the side fired type. The oil after being raised to a conversion temperature in the heating coil, is directed through the transfer line 12 regulated by a valve 13 to an expansion chamber 14.

In the expansion chamber, it is collected in a substantial body and it is here that a greater part of the conversion takes place. The expansion chamber is equipped with try-cocks 15 for ascertaining the liquid level in the chamber, and with residuum drawoff pipes 16 regulated by valves 17. There are removable heads in the upper and lower ends of the chamber 14 for facilitating the cleaning of the chamber.

The vapors evolved from the chamber 14 pass off through the vapor line 18 controlled by a valve 19, and are introduced to the lower part of the reflux condenser or dephlegmator 1. The unvaporized liquids and residual substances may be intermittently or continuously removed from the lines 16 in order to maintain the desired liquid level in the chamber, and at the same time prevent the objectionable accumulation of precipitated carbon therein.

The vapors directed to the dephlegmator or initial reflux condenser, are subjected to a refluxing action, due to their coming in radiating contact with the relative cooler surfaces of the column which are air cooled. The vapors in their travel through the column are also caused to pass in a circuitous route by the positioning of baffle members 20 at intervals on the opposite sides of the column. The vapors passing off from the top of the column through the pipe 21 controlled by a valve 22, are introduced into the bottom of the secondary fractionating column 2 where they are subjected to the dephlegmating action of the reflux liquid separated from the vapors in the initial column 1, and subsequently passed through the intercooler 4 and gooseneck 3. This reflux liquid comprises the relatively high boiling point fractions separated out as reflux condensate, and are introduced through a spray 23 positioned in the top of the column 2. This liquid refluxing medium after being separated out in the column 1 as previously explained, is passed through the inter-cooler 4 which comprises an enlarged receptacle or reservoir having corrugated sides in order to increase the radiating surface. The raw oil after being preheated by circulating about this inter-cooler, is drawn off through the line 24 controlled by the valve 25, which communicates with the charging line 7. By manipulating the valve 25 in the line 24, the valve 26 in the line 6, and the valves 27 and 28 in the line 7, a controlled flow of the charging oil which is diverted to the preheating tank 5 may be effected. From the bottom of the inter-cooler are two drawoff lines, one leading to the gooseneck 3 by means of which the reflux liquid may be introduced into the top of the secondary column 2 and a second pipe 29 regulated by a valve 30 by means of which the reflux oil may be diverted directly into the lower leg 31 of the column 2, instead of being introduced into the top of the column through the gooseneck 3. Thus, the extent of dephlegmation of the vapors in the secondary column may be accurately controlled.

The process may be operated as efficiently as possible, and the loss of heat minimized. The heat from the reflux liquid in the inter-cooler is taken up by the charging stock, the vapors passing from the expansion chamber pass through the primary column, and are prevented from passing directly through the top of the secondary tower or column by the liquid seal of reflux condensate maintained in the inter-cooler and gooseneck. The dephlegmated vapors from the primary column pass through the vapor line into the bottom of the second column where they rise and meet the cool reflux introduced into the top of the column through the spray pipe 23. The secondary column is heavily lagged so that the greater part of the heat from the ascending vapors is taken up by the descending partially cooled reflux condensate.

In order to regulate the amount of reflux passing through the secondary column, a drawoff valve shown at 30 is made use of, which drains part of the reflux directly into the bottom or lower leg of the secondary column from which it may be recycled through the pipe 32 into the charging line 7. The still vaporous oil constituents rising to the top of the secondary column pass through a vapor line 33 regulated by a valve 34 to a final condenser coil 35 positioned in the condenser box 36, after which they are directed through a line 37 controlled by a valve 38 to the receiver 39. This receiver is equipped with a pressure relief valve 40, pressure gauge 41, and liquid level gauge 42. Near the bottom of the receiver is a liquid drawoff line 43 controlled by a valve 44.

By making suitable connections, the initial dephlegmating and secondary columns may be used in cracking stills where the operation is carried on under pressure, or in systems where the oil is treated under atmospheric conditions.

A further advantage of the process is the fact that the preheating of the charging stock is effected by the reflux condensate while being kept separate therefrom. Further, it has been found that where the charging stock is introduced into the top of the dephlegmating column, there is carried over with the vapors certain of the lighter fractions which are released from the oil immediately on its coming in contact with the hot vapors rising through the dephlegmator. Certain of these fractions are objectionable when collected with the distillate in the receiver. By first preheating the oil, and utilizing the reflux condensate as a dephlegmating medium in the secondary column, there is used a refluxing medium which is of such a refractory nature that it is not as readily converted by the hot vapors as is the charging stock, and serves as a more satisfactory cooling medium.

By careful manipulation of the valve 30, the amount of this refluxing medium introduced into the top of the column 2 may be carefully controlled while the remaining portion is drawn off and introduced below the vapor line 21 through which the vapors are introduced into the secondary column.

By treating gas oil of approximately 32° Baumé, to temperatures ranging from 660° to 900° F., and maintaining pressures from 50 to 200 pounds upon the system, a relatively uniform distillate having a gravity of from 48° to 52° Baumé and comprising from 40% to 60% of the charging stock may be separated therefrom.

We claim as our invention:

1. A process for cracking hydrocarbon oils, consisting in raising the oil to a cracking temperature in a heating zone, in passing the heated oil to an enlarged zone, wherein substantial vaporization occurs, in passing the vapors thence to a primary dephlegmating zone, in passing uncondensed vapors from said primary dephlegmating zone to a secondary dephlegmating zone, in withdrawing reflux condensate from said primary dephlegmating zone, in introducing portions of such withdrawn reflux condensate to said secondary dephlegmating zone, to act as a dephlegmating medium for the vapors therein, in returning reflux condensate from said secondary dephlegmating zone to said heating zone without again admitting any portion thereof to either of said dephlegmating zones, in condensing the vapors issuing from said secondary zone, and in maintaining in superatmospheric pressure on the oil undergoing conversion and the vapors in both said primary dephlegmating zone and secondary dephlegmating zone.

2. A process of converting hydrocarbon oils consisting in heating and vaporizing the oil under a substantial pressure, subjecting the vapors to an initial reflux condensing action, separately withdrawing the dephlegmated vapors and reflux condensate separated out in the initial refluxing stage, in thereafter simultaneously cooling the reflux condensate, and preheating the charging stock for the process by circulating the charging stock in heat interchange relation with said reflux condensate, thence passing the cool reflux condensate and vapors in opposed directions and in intimate contact through a secondary stage of dephlegmation, condensing the vapors from the final stage and collecting them as liquid distillate.

3. A process for converting heavy hydrocarbon oils into lighter hydrocarbon oils, consisting in subjecting the oil to cracking conditions of temperature and pressure, in effecting substantial vaporization of the oil, in dephlegmating the evolved vapors by passage through successive zones of dephlegmation, in withdrawing the reflux condensate from the first zone of dephlegmation, in cooling such withdrawn reflux condensate by passing the same in heat interchange relation with charging oil for the process and in thereafter introducing cooled reflux condensate to the final zone of dephlegmation, to constitute the sole introduced dephlegmating medium for the vapors passing through such final zone of dephlegmation, and in recovering the vapors issuing from the final dephlegmating zone as the final product of the process.

4. A hydrocarbon oil cracking process which comprises subjecting the oil to cracking conditions of temperature and pressure and separating evolved vapors from unvaporized oil, passing the vapors to a primary dephlegmating zone and partially condensing the same therein thereby forming reflux condensate, introducing the vapors uncondensed in said primary dephlegmating zone to a secondary dephlegmating zone, returning a portion of said reflux condensate to the oil being subjected to cracking conditions of temperature and pressure for retreatment in the process, passing another portion of said reflux condensate in countercurrent heat exchange relation with the vapors in said secondary dephlegmating zone, returning reflux condensate formed in said secondary dephlegmating zone to the oil being subjected to cracking conditions of temperature and pressure, and condensing the vapors uncondensed in said secondary dephlegmating zone.

5. A hydrocarbon oil cracking process which comprises subjecting the oil to cracking conditions of temperature and pressure in a heating zone, separating evolved vapors from unvaporized oil, dephlegmating said vapors in a primary dephlegmating zone, cooling reflux condensate formed in said primary dephlegmating zone by heat exchange with charging oil for the process thereby preheating the charging oil, passing uncondensed vapors from said primary dephlegmating zone to a secondary dephlegmating zone and partially condensing the same therein by direct heat exchange with the cooled reflux condensate, passing the preheated charging oil to said heating zone, and condensing the vapors uncondensed in said secondary dephlegmating zone.

6. A hydrocarbon oil cracking process which comprises heating a stream of the oil to cracking temperature under pressure in a heating zone, discharging the heated oil into a vapor separating zone, separately withdrawing vapors and unvaporized oil from said separating zone, subjecting said vapors to primary dephlegmation in a primary dephlegmating zone to condense insufficiently cracked fractions, introducing the vapors uncondensed in said primary dephlegmating zone to a secondary dephlegmating zone, passing charging oil for the process in indirect heat exchange relation with reflux condensate separated from the vapors and passing the reflux condensate in direct countercurrent heat exchange relation with the vapors in said secondary dephlegmating zone, passing said charging oil to said heating zone, and condensing the vapors uncondensed in said secondary dephlegmating zone.

7. A hydrocarbon oil cracking process which comprises heating a stream of the oil to cracking temperature under pressure in a heating zone, discharging the heated oil into a vapor separating zone, separately withdrawing vapors and unvaporized oil from said separating zone, subjecting said vapors to primary dephlegmation in a primary dephlegmating zone to condense insufficiently cracked fractions, introducing the vapors uncondensed in said primary dephlegmating zone to a secondary dephlegmating zone, passing the vapors in said secondary dephlegmating zone in direct countercurrent heat exchange relation with reflux condensate separated from the vapors, returning a portion of the reflux condensate formed in said primary dephlegmating zone to said heating zone without passage through said secondary dephlegmating zone, returning reflux condensate formed in the secondary dephlegmating zone to said heating zone, and condensing the vapors uncondensed in said secondary zone.

JACQUE C. MORRELL.
HARRY P. BENNER.